(12) United States Patent
Kidiyarova-Shevchenko et al.

(10) Patent No.: US 7,440,490 B2
(45) Date of Patent: Oct. 21, 2008

(54) METHOD AND APPARATUS FOR MULTI-USER DETECTION USING RSFQ SUCCESSIVE INTERFERENCE CANCELLATION IN CDMA WIRELESS SYSTEMS

(76) Inventors: Anna Kidiyarova-Shevchenko, Solbyn, Saro (SE) S-429 42; Tony Ottosson, Doktor Bex Gata 7B, Goteborg (SE) S-413 24; Erik Strom, Emil Strandbergsvag 22, Kullavik (SE) S-429 33

( * ) Notice: Subject to any disclaimer, the term of this patent is extended or adjusted under 35 U.S.C. 154(b) by 1124 days.

(21) Appl. No.: 10/321,609

(22) Filed: Dec. 18, 2002

(65) Prior Publication Data

US 2004/0120299 A1 Jun. 24, 2004

(51) Int. Cl.
*H04B 1/707* (2006.01)
*H04B 7/216* (2006.01)
(52) U.S. Cl. ............ 375/148; 375/152; 370/342
(58) Field of Classification Search ......... 375/142–144, 375/147, 148, 150, 152, 260, 343; 370/320, 370/335, 342
See application file for complete search history.

(56) References Cited

U.S. PATENT DOCUMENTS

| | | | | |
|---|---|---|---|---|
| 6,137,788 | A * | 10/2000 | Sawahashi et al. | 370/342 |
| 6,529,495 | B1 * | 3/2003 | Aazhang et al. | 370/342 |
| 6,775,260 | B1 * | 8/2004 | Dabak et al. | 370/342 |
| 6,968,023 | B2 * | 11/2005 | Aoyama et al. | 375/346 |
| 2002/0018454 | A1 * | 2/2002 | Misra et al. | 370/336 |
| 2002/0126644 | A1 * | 9/2002 | Turpin et al. | 370/342 |
| 2002/0137546 | A1 * | 9/2002 | Miya et al. | 455/561 |
| 2003/0048800 | A1 * | 3/2003 | Kilfoyle et al. | 370/441 |
| 2003/0063576 | A1 * | 4/2003 | DlFazio | 370/280 |
| 2003/0076872 | A1 * | 4/2003 | Jalloul et al. | 375/141 |
| 2003/0099225 | A1 * | 5/2003 | Oates | 370/342 |

OTHER PUBLICATIONS

A. Yu Kidiyarova-Shevchenko et al., "Superconducting Multiuser Detector for 3G Base Stations," Institute of Physics Publishing, Supercond. Sci. Technol., V. 15, 2002, pp. 126-132.
Anna Yu. Kidiyarova-Shevchenko et al., "RSFQ Asynchronous Serial Multiplier and Spreading Codes Generator for Multiuser Detector", IEEE Transacions on Applied Superconductivity, vol. 13, No. 2, Jun. 2003, pp. 429-432.
A. Yu. Kidiyarova-Shevchenko, "RSFQ Iterative Linear System Solver for Superconducting Multiuser Detector", Physica C 372-376 (2002), pp. 131-135.

(Continued)

*Primary Examiner*—Young T. Tse
(74) *Attorney, Agent, or Firm*—Young & Thompson

(57) ABSTRACT

A method and apparatus for using a multi-user detector for reducing multiple access interference (MAI) in a direct sequence CDMA wireless system such as W-CDMA. A superconducting rapid single flux quantum (RSFQ) RF digital receiver operating in combination with an RSFQ successive interference canceller (SIC) is located in the base stations of the wireless system. In the present invention, the RSFQ SIC is a vector machine capable of processing the cross-correlation matrices using an iterative method to decorrelate the user binary code sequences from the input signal in which the interference components are removed. According, the reduction in interference results in a significant increase in system capacity while improving cellular coverage area.

30 Claims, 5 Drawing Sheets

OTHER PUBLICATIONS

A. Yu. Kidiyarova-Shevchenko, "RSFQ Spreading Code Generator for W-CDMA Multiuser Detector", Physica C 368 (2002), pp. 222-226.

Lars K. Rasmussen et al., "A Matrix-Algebraic Approach to Successive Interference Cancellation in CDMA", IEEE Transactions on Communications, vol. 48, No. 1, Jan. 2000, pp. 145-151.

* cited by examiner

METHOD AND APPARATUS FOR MULTI-USER DETECTION USING RSFQ SUCCESSIVE INTERFERENCE CANCELLATION IN CDMA WIRELESS SYSTEMS

FIELD OF THE INVENTION

The present invention relates generally to interference reduction in wireless telecommunication systems and, more particularly, to interference cancellation for reducing interference in CDMA based systems.

BACKGROUND OF THE INVENTION

Wireless telecommunication service providers are keenly interested in providing high quality, reliable services for their customers in today's highly competitive marketplace. A significant aspect affecting the service quality is the consistency of radio coverage within cell coverage areas of the network. Moreover, an additional aim from the provider's perspective is to be able to increase capacity while maintaining quality and reliability. As known by those skilled in the art, telecommunication networks operating in accordance with direct sequence code division multiple access (DS-CDMA), which are also referred to as spread spectrum systems, the service quality is particularly affected by the number of users in the cell. This is because the inherent nature of spread spectrum systems permits all users to transmit and receive on a common frequency band thus each of the transmissions necessarily "interfere" with each other in what is known as multiple access interference (MAI).

As the number of users in the cell increase more interference is introduced causing the mobiles to transmit with increased power in order to sufficiently communicate with the base station and thereby making the problem worse. This effect tends to be more prominent on uplink transmissions from mobiles since their power levels tend to be more limited in comparison to that of the base station. Another consequence of increased interference is that the cell coverage area tends to contract, on the other hand as less traffic is present, the coverage area of the cell tends to expand. The tendency for cells to shrink and expand in relation to number of users in the cell is known as "cell breathing" and occurs, for example, since each user in a CDMA system cumulatively contributes to the interference in the cell since they simultaneously share a common frequency band.

Another type of interference that has a significant affect on CDMA systems is multipath interference. Radio channel signals between a transmitter and receiver typically do not propagate only along one path. Reflections and refractions of a signal, which are particularly acute in urban environments having many buildings and obstructions, will be received over a number of different paths which are copies of the transmitted signal, each having different amplitudes, phases, temporal delays and arrival angles. At the receiver these signals can interfere with each other, in some instances being constructive at some points and destructive at others. Still another type of interference is the so-called near-far interference which happens when a strong signal from a mobile close to the base station overwhelms a weaker signal from a distant mobile closer to the cell boundary, for example.

An advantage of CDMA systems is that spread spectrum modulation combined with the use of a Rake receiver, can be effective against multipath interference. Rake receivers are used to receive and resolve multipath signals in which multiple copies of the signal are received with varying delays. This is because the spread spectrum waveform is well matched to the multipath channel and thus CDMA signals employ the use of multipath diversity, which also reduces the effect from signal fading.

FIG. 1 shows a simplified block diagram of an exemplary direct sequence CDMA transmitter. The binary data signal is directly modulated by a discrete code valued signal that is discrete in time. The data signal is multiplied by the code signal shown by the code generator block 110 whereby the resulting signal modulates the wideband carrier shown by the wideband modulator block 120. A carrier generator 130 then modulates the wideband carrier signal 120 for transmission through antenna 140. Various code modulation techniques can be used. Often these are a form of phase shift keying such as binary phase shift keying (BPSK) or quadrature phase shift keying (QPSK), for example. The code signal is referred to as the chip rate in which one chip is equal to one symbol in the spreading code signal.

FIG. 2 shows a simplified block diagram of an exemplary direct sequence CDMA receiver. At the receiver, the signal is first down converted with the help of carrier generator 250. The signal is then coherently detected and filtered with the help of filter matching on the chip waveform that is then despread with despreader block 210. In order to despread the signals, the receiver must know the code sequence used in spreading the signal, the codes of the received signal, together with the condition that the locally generated code generated by code generator 220 must be synchronized. The code synchronization tracking block 230 performs the operation of synchronizing the signal during the entire time the signal is being received. The signal despread by despreading block 210 is fed into data demodulator block 240. The data demodulator block 240 demodulates the signal in order to allow the original data to be recovered. Recovery of the data is possible at the receiving end since the code sequences are known a priori.

The lack of spectral resources coupled with increasing demand for wireless voice and data services such as Internet access, audio, video, and multimedia applications have highlighted capacity as a critical issue. Among other things the lack of capacity has been the driving force behind the shift to wideband systems such as Wideband Code Division Multiple Access (W-CDMA). W-CDMA standard is a preferred air interface fulfilling 3G requirements for improved quality of service and capacity. It is able to provide connections of 384 bits/s for mobile applications and as much as 2 Mbits/s in stationary environments. The capacity of direct sequence DS-CDMA systems such as W-CDMA using a Rake receiver is interference limited i.e. more users in a cell creates more interference for all the other users. Since the spreading codes in signals from the users are not completely orthogonal, this results in residual interference within the cell, known as multiple access interference (MAI), where when together with interference from neighboring cells, significantly degrades performance in the cell. MAI is a major factor in limiting cell capacity and the removal of such interference would lead to a significant increase in capacity.

A conventional approach for dealing with interference is by employing a single-user matched filter in combination with Rake combiner. The users use spreading sequences of nearly uncorrelated codes so that interference from other users are treated as non-coherent interference and rejected, however this technique has been shown not to be the optimal approach. This is because the sum of the cross-correlation between codes at high loading can be significantly larger than the autocorrelation that is detected. Furthermore, the interference itself contains much information on the structure and content of the signal and can be used advantageously. In W-CDMA, multi-user detectors (MUD), also referred to as interference cancellers, provide a means for reducing the effect of multiple access interference. A multi-user detector (MUD) is an advanced detector in base stations that uses a more sophisticated approach to remove interference components from the signal. The benefit of using MUDs is that they dramatically increase system capacity. Furthermore, they can be used effectively for mitigating the effect of near-far interference that typically can plague DS-CDMA systems, by first detecting, and then subtracting the problem mobile from the input signal.

However, use of the optimum multi-user detector has not been found to be practical for implementation. This is because the complexity of the optimum detector becomes exponential to the number of users and requires computations that are too demanding for the current silicon based IC processing technology or any conventional digital technology currently employed. Thus, a number of suboptimum multi-user and interference receivers have been proposed or developed. The suboptimum receivers can be classified into two major categories: linear multi-user detectors and subtractive interference cancellers. Linear detectors apply a linear transform into the outputs of the matched filters that try to remove the MAI i.e. interference resulting from correlations between user codes. Examples of linear multi-user detectors that are most commonly referred to are decorrelating detectors, where the linear filter has a zero output, and the minimum mean square error (LMMSE) detector, where the linear filter has a minimum output energy. In subtractive interference cancellation, the MAI is estimated and then subtracted from the received signal. The cancellation can be performed with successive interference cancellation (SIC) or with parallel interference cancellation (PIC).

The successive cancellation technique requires at least several iterations for a user however the individual iterations are less complex than with the parallel cancellation technique. Furthermore, SIC does not distinguish users from one another from the spreading sequences and the canceling is performed serially in which the delay bits are added such that the complexity increases linearly with the number of users and iterations. Moreover, SIC has less computational complexity than PIC, which is more hardware intensive to process users in parallel. In a comparative sense, PIC is based on a Jacobi algorithm and thus requires specific conditions on the interference matrix for convergence. Special techniques can be used to reach convergence for particular scenario of mobile transmission but there is generally no unique solution. Moreover, PIC typically requires more iterations than SIC, which means the converge rate is usually much slower. The computational complexity is considerably larger in PIC due to the intensive parallel processing that has to be applied. In SIC, the converge rate is generally much faster and the processing flow can be serialized.

Even though the relative complexity is lower, the computational demands from SIC require processor circuits capable of producing several Giga operations per second, which is extremely challenging when using conventional integrated circuits. The serial nature of the SIC algorithm requires very fast electronics in order to process the many channels present in the multiple access interference. Furthermore, when assuming long spreading codes, the cross-correlation between the spreading codes changes from symbol to symbol instead of over several symbols, thereby increasing the complexity and required processing even further. In fact, the reason for the option of using short spreading codes in W-CDMA was to enable the future use of a multi-user detector with the projected available processing power. However, the use of long codes is preferable due to better interference averaging, and thus better performance in canceling the interference. The implementation of comprehensive SIC algorithms are currently not practical due to conventional hardware limitations and, at present, only partial cancellation methods have been considered, which have not been found to be very beneficial.

In view of the foregoing, it is desirable to provide a technically viable solution for using interference cancellation in wireless CDMA systems.

SUMMARY OF THE INVENTION

Briefly described and in accordance with embodiments and features thereof, the invention provides a method and apparatus for implementing a multi-user detector for reducing multiple access interference (MAI) in direct sequence CDMA wireless systems such as W-CDMA. In accordance with a first architecture embodiment of the present invention, a decorrelator-Rake arrangement is implemented where an input signal, received by the base station, comprising a plurality user of partially cross-correlated binary code sequences is fed into a bank of matched filters (despreaders) as a first stage of interference removal. The output vector from the bank of matched filters is fed into a superconducting rapid single flux quantum (RSFQ) vector processing unit applying a successive interference cancellation (SIC) Gauss-Seidel iterative algorithm to the cross-correlation matrices to decorrelate the user binary code sequences. The interference components are removed and the output from the RSFQ SIC is fed into a bank of Rake combiners to recover original data transmitted by the mobile users.

In a second architecture embodiment of the invention, a Rake-decorrelator arrangement is implemented where the input signal comprising a plurality of user binary code sequences is fed into a bank of matched filters. The output vector from the matched filters is fed into a bank of Rake combiners. The output vector from the Rake combiners is fed into the RSFQ vector processing unit which applies a SIC Gauss-Seidel iterative algorithm to the cross-correlation matrices to decorrelate the user binary code sequences. The interference components are then removed to recover original data transmitted by the mobile users.

In another aspect of the invention, within the RSFQ SIC the inner iterations, performed inside the main iterations dealing with signals arrived at different time intervals, can be also performed in a parallel way using an Jacobi algorithm, for example.

In further aspect of the invention, the signal processing required for multi-user detection is performed before the matched filters. Further included is a memory for the storing signal processing data such that the size of the memory is in proportion to the total number of transmitted signals per packet multiplied by the oversampling factor.

The invention, through which the reduction in interference is achieved, results in at least a two-fold increase in uplink capacity of the W-CDMA system while improving cellular coverage. Furthermore, the multi-user detector of the invention improves power management and leads to the lowering of radiated power of approximately 4-10 dB while increasing the average data transmission rate with less retransmissions due to bit errors. Additionally, the multi-user detector can be installed into base stations as needed since it can be readily connected to preexisting outputs of the matched filters or Rake combiners. The advantages will be more clearly understood when taken together with the following detailed description.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

The present invention is directed toward improving the capacity and spectral efficiency in direct sequence CDMA systems, such as W-CDMA, by reducing the multiple access interference (MAI) generated by users within the cell and by neighboring cells. The presence of MAI can be attributed to the non-perfect separation of the users in the despreading process. A practical implementation of a multi-user detector (MUD) in wireless base stations is carried out by overcoming the processing deficiencies of prior art MUDs described in the preceding sections. In accordance with the present invention, the computational processing of the multi-user detector using long spreading codes is performed by superconducting digital rapid single flux quantum (RSFQ) devices. Further described by the present invention is the general idea of multi-user detection and various embodiment architectures that are implemented in RSFQ technology.

The field of superconductor electronics has made remarkable advances over the last 25 years. The commercial viability of superconductor technology has been demonstrated by the success and use in products such as MRI medical scanning machines for many years. As known by those skilled in the art, digital electronics based on rapid single flux quantum (RSFQ) has been shown to provide extraordinary performance characteristics of ultra-high speed and extremely low power consumption. The storage information in RSFQ devices is based on the fundamental phenomenon of quantization of magnetic flux and implemented in Josephson junctions. Ultra-high speed RSFQ logic circuits have been developed that can operate in excess of 100 GHz. RSFQ ICs can be fabricated from several superconducting metals such as niobium (Nb/NbN) operating at around 4-10 K (degrees Kelvin) or many of the so-called high-temperature superconductors (HTS) operating between 20-77 K. Ultra-high speed superconductor logic circuits of this type are available e.g. from HYPRES Incorporated of Elmsford, N.Y., U.S.A.

While these temperatures are extremely low, there are refrigerators, also referred known as cryocoolers, presently on the market that can sustain these temperatures that are very reliable and economical with service lifetimes on the order of 15 years. Cryocoolers exist that have been developed specifically for use in wireless base stations that fit into a standard 19-inch (28 cm) rack. Cryocoolers of this type are sold by e.g. Conductus Incorporated of Sunnyvale, Calif., U.S.A. and Superconductor Technologies Incorporated of Santa Barbara, Calif., U.S.A.

A description follows of two exemplary architecture embodiments used in the implementation of the multi-user detector of the present invention.

Figure 1:
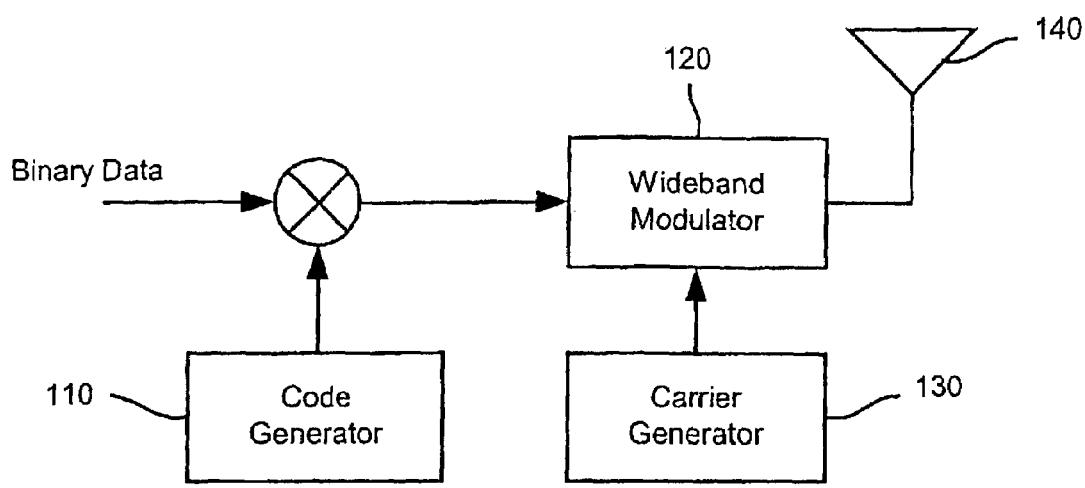
FIG. 1 shows a block diagram of an exemplary direct sequence CDMA transmitter.
Figure 2:
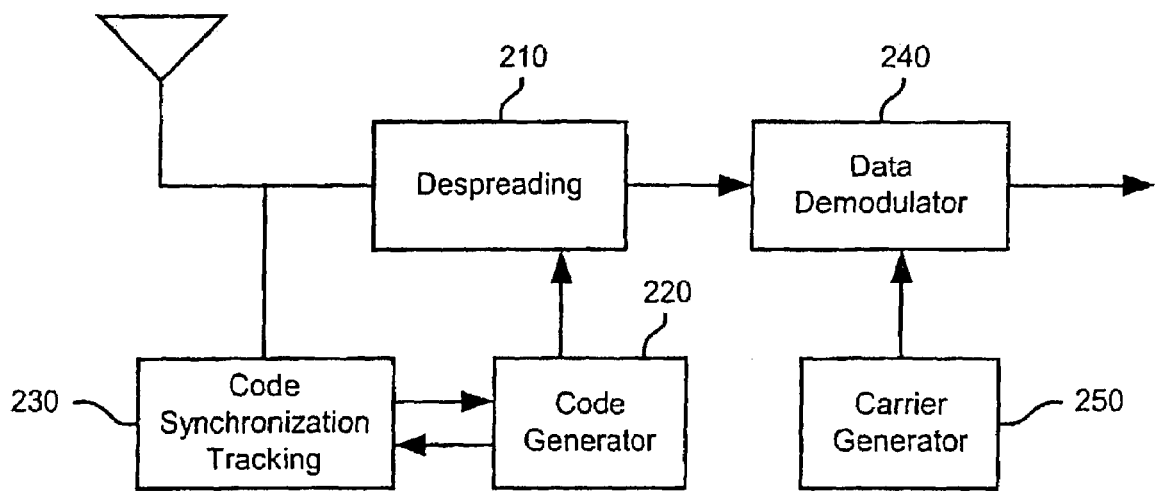
FIG. 2 shows a block diagram of an exemplary direct sequence CDMA receiver.
Figure 3:
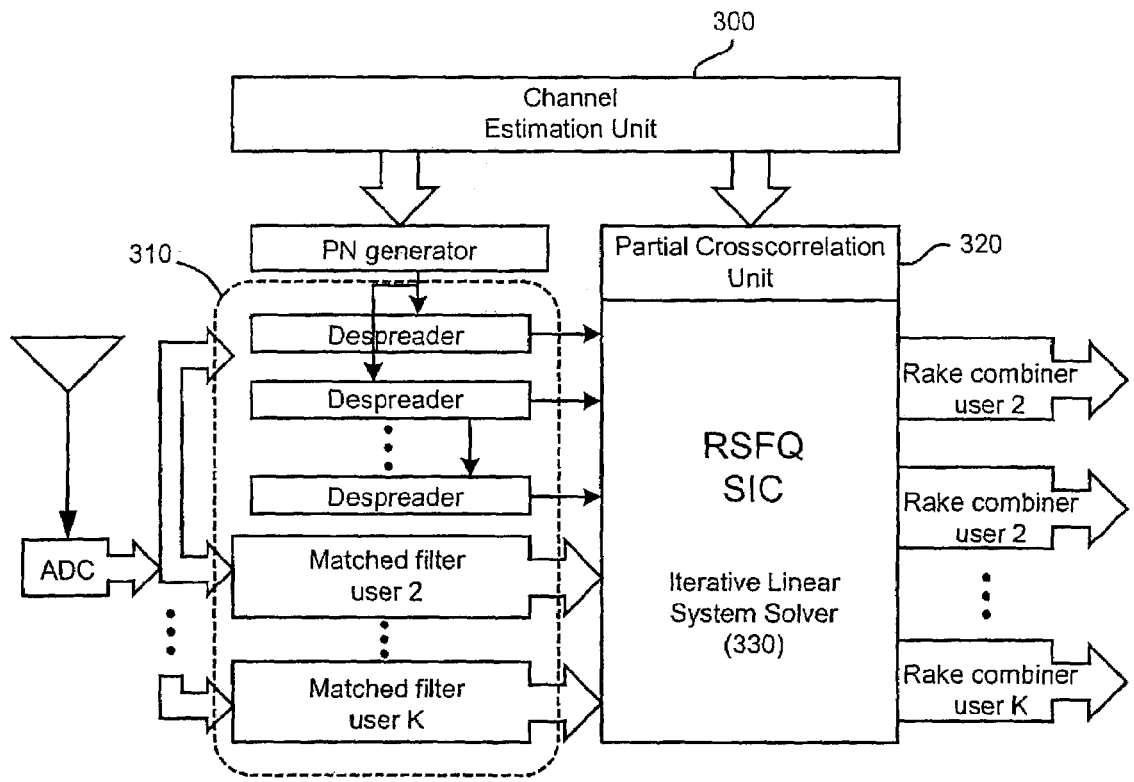
FIG. 3 shows a block diagram for a first embodiment architecture of the RSFQ SIC implemented into the digital signal processing chain of a base station receiver operating in accordance with the invention.

FIG. 3 shows a block diagram for a first embodiment architecture of the RSFQ SIC implemented into the digital signal processing chain of a W-CDMA base station receiver operating in accordance with the invention. The RSFQ SIC operates with data coming either from a despreader or matched filters 310. Inserted in this way into the signal processing chain the RSFQ SIC becomes an add-on component that does not require modifications to the other electronics.

Figure 4:
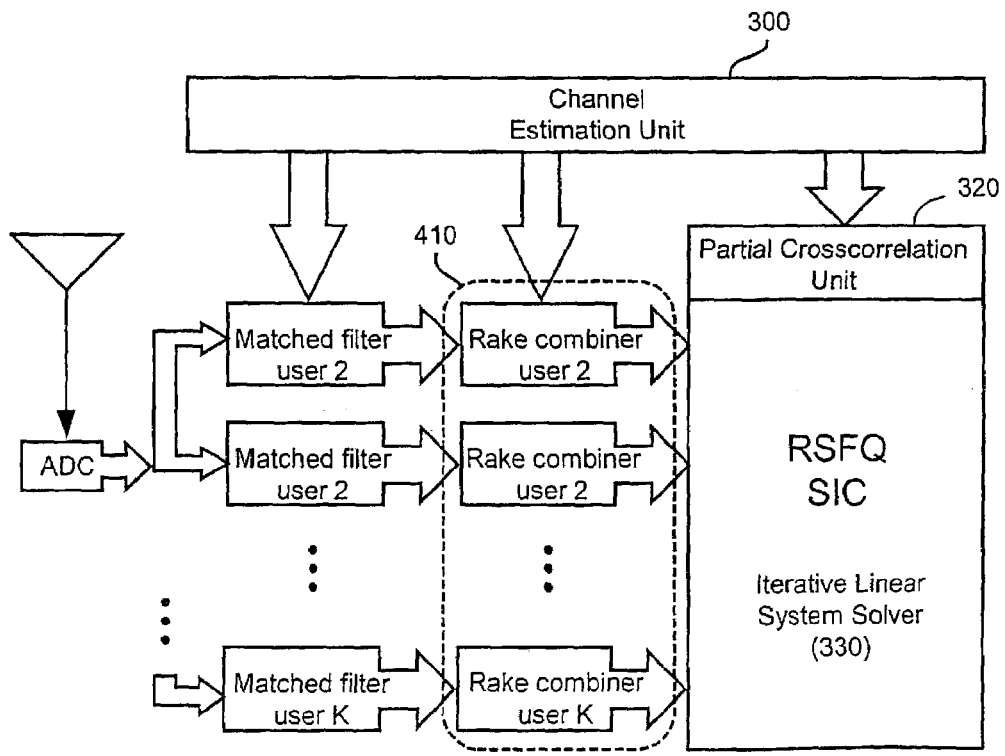
FIG. 4 shows a block diagram for a second embodiment architecture of the RSFQ SIC implementation operating in accordance with the invention.

FIG. 4 shows a block diagram for a second embodiment architecture of the RSFQ SIC implementation operating in accordance with the invention. Similarly, with RSFQ SIC operates with data coming after the Rake combiner 410 thereby requiring no other modifications to the electronics. The RSFQ SIC has three inputs: vector of despreaded symbols, vector of channels gains, and vector of relative channels delays available at the Channel Estimation Unit 300 (CEU). The base station receiver described supports coherent reception of the channel, a front-end digitizer with minimum required resolution 5 bits and 4 times oversampling over the chip rate 3.84 mcps, amplitude estimation for the channels, and the relative delay estimation for the channels.

With regard to the data channel, due to the successive method of interference rejection there is a trade off between system load, data rate and number of iterations required to reach target performance. The load of the system is defined as a product of number of active Dedicated Physical Channel (DPCH) and number of effective multi-paths as described earlier. Supporting SNR gain in 10 dB at BER equal to 0.001, the RSFQ SIC processes at least 100 DPCH with 10 effective multi-paths at pre-spreading data rate 2 mbps. In the data channel, the data is spread with variable spreading factor and the channel data may be scrambled by either long or short scrambling code based on families of the Gold codes, m-sequences, or their combinational fellows.

Regarding the multi-path propagation conditions considered for operation of the RSFQ SIC are multi-path fading and an Additive White Gaussian Noise (AWGN) environment having a maximum relative delay 0.25 µs. Moreover, slow fading conditions and constant multi-path power during one symbol interval is assumed. Also assumed is a Rayleigh amplitude distribution and equal probable relative phase shift, that gives Gaussian power distribution with zero mean.

System Model and Detection Algorithms

Operation of the RSFQ SIC is based on block-wise interference cancellation using the Gauss-Seidel iterative method. Upon each iteration a vector of symbol estimates at time T is updated using the obtained on the previous iteration information about the vector of symbols transmitted at time T−1 and T+1. Number of iterations corresponds to the number of time symbol intervals involved into consideration. The RSFQ SIC of the invention supports up to 7 iterations.

The standard vector model used in the two embodiment architectures of the multi-user detectors of the present invention is described. For the interested reader the details of which can be found in the appendix at the end of the description.

At the conventional part of the receiver, the incoming radio frequency (RF) signal is amplified, down-converted to baseband (complex signals), and filtered by a chip-matched filter. The output of the chip-matched filter is digitized at the rate of Ns $f_{chip}$ samples per second, where $N_S$ is the oversampling factor and $f_{chip}$ is the chip rate ($f_{chip}$=3.84 Mchip s$^{-1}$ in W-CDMA). The digital signal is forwarded to the matched filter, where each of the K users are separated using matched filters tuned to the spreading codes of each individual user. If the channel is frequency selective (several time-shifted replicas are received), we need one matched filter per user and signal path. The signal paths corresponding to one user are then weighted together in the Rake receiver.

Since matched filter outputs are already available in existing systems, it is convenient to allow a multi-user detector to use these outputs. Hence, the multi-user detector becomes an add-on that can be added later if improved performance is needed. Furthermore, it can be shown that the matched filter bank is actually an optimum pre-processing device in the sense that all necessary information needed to perform optimum multi-user detection is available.

The output of the bank of matched filters can be expressed in vector form as (see appendix), $$y_{MF} = R_{MF} Hd + n \quad (1)$$

where $y_{MF}$ is the output of a bank of matched filters, $R_{MF}$ is a real-valued cross-correlation matrix, H is a block diagonal matrix of complex channel gains, d is a vector of the bits of all users (coded as ±1), and n is a complex-valued noise vector.

The task of the receiver is to detect d given the observation y. This can be done in many ways. We will here describe two possible variants of the so-called decorrelator multi-user detector. The two embodiment architectures are also illustrated in FIGS. 3 and 4. The iterative methods that approximate the decorrelating detector are described in the section on Successive Interference Cancellation.

Decorrelator-Rake Receiver

Regarding to the first embodiment architecture, we note that, $$y_{MF} = R_{MF}(Hd + R_{MF}^{-1} n) = R_{MF} u_{MF}.$$

Hence, we can find $u_{MF}$ by solving a system of linear equations. This referred to as the decorrelating step, since it is equivalent to pre-multiplying with the inverse of a correlation matrix, $$u_{MF} = R_{MF}^{-1} y_{MF} = Hd + R_{MF}^{-1} n. \quad (2)$$

We can form the decision for d by Rake-combining the output from the decorrelator as, $$d = \text{sgn } Re\{H^* u_{MF}\} = \text{sgn } Re\{H^* Hd + H^* R_{MF}^{-1} n.\} \quad (3)$$

where the superscript * indicates the complex conjugate transpose and the sign operation is taken element-wise. Since H*H can be shown to be a diagonal matrix with positive elements, we make correct decisions if the noise vector is sufficiently small. The resulting architecture is shown in FIG. 3.

The elements of the H matrix are produced by the channel estimation unit. However, the RSFQ part of the receiver needs to compute $R_{MF}$. In the appendix, it is shown that the (q, r) the element of $R_{MF}$ can be computed to be, $$[R_{MF}]_{q,r} = \sum_{m=-(N-1)}^{N-1} v([mN_s + (n-n')NN_S + (p_{k,l} - P_{k',l'}) + QN_s]T_c/N_s) \sum_{i=0}^{N-1} c'_{n,k}[i] c'_{n',k'}[i-m]$$

where k, l, n and k', l', n' depend on q and r, $c_{n,k}'[i]$ is the code sequence for the nth user's kth symbol, v(t) is a causal pulse with a raised-cosine spectrum (assumed to have effective support [0, 2QT$_c$]), $T_c$=1/$f_{chip}$, and $\tau_{k,l}=p_{k,l}T_c/N_s$ is the delay of the kth user's lth propagation path. The samples of v(t) can be pre-computed and stored in a table, and the code sequences are generated in the receiver front-end. We note that $[R_{MF}]_{q,r}$ is a linear combination of 2N−1 terms, where each term is a cross-correlation between the binary code sequences $c_{n,k}'[i]$ and $c_{n',k'}'[i]$ at a certain lag.

Rake-decorrelator Receiver

With regard to the second architecture embodiment, we can also start with Rake-combining as, $$y_{rake} = H^* y_{MF} \quad (4)$$
$$= H^* R_{MF} Hd + H^* n$$
$$= R_{rake} d + H^* n$$
$$= R_{rake}(d + R_{rake}^{-1} H^* n)$$
$$= R_{rake} u_{rake}$$

followed by a decorrelating step, $$u_{rake} = R_{rake}^{-1} y_{rake} = d + R_{rake}^{-1} H^* n. \quad (5)$$

Again, we will make correct decisions if the noise vector is sufficiently small. The resulting architecture is shown in FIG. 4.

Clearly, the receiver needs access to $R_{rake}$. In the appendix, it is shown that the (q, r)th element of $R_{rake}$ can be computed to be, $$[R_{rake}]_{q,r} = \sum_{i=1}^{L} \sum_{i'=1}^{L} h_{k,l}^* h_{k',l'}^* [A]_{l,l'} \quad (6)$$

where A is a certain L×L submatrix of $R_{MF}$, and $h_{k,l}$ is the complex channel gain of the kth user's lth propagation path. The definitions of A, k and k' depend on q and r.

Successive Interference Cancellation

In the previous section we have presented two architectures for multi-user detection; the decorrelator-Rake and the Rake-decorrelator illustrated in FIGS. 3 and 4 respectively. As stated previously, the decorrelator solves a system of linear equations (equations (2) or (5)). These linear systems can be solved using iterative methods as, for example, described in publication [4] by Rasmussen L K, Lim T J and Johansson A-L 2000, "A Matrix-Algebraic Approach To Successive Interference Cancellation", CDMA IEEE Trans. Commun. 48 145-51. The two main categories are the SIC (Gauss-Seidel algorithm) and the Parallel Interference Canceller (PIC) (Jacobi algorithm). The SIC is, in general, more reliable in the sense that it is guaranteed to converge with any initial vector (if the cross-correlation matrix is positive definite, which is a reasonable assumption). Another advantage of the SIC is the fast rate of convergence. It has been shown that somewhere around seven iterations of SIC are sufficient to reach convergence. After convergence, the resulting bit error rate is the same as for the decorrelating receiver described previously.

To perform iterations on a symbol level two basic hardware blocks are required: the partial cross-correlation unit 320 (PCU) and the iterative linear system solver 330 (ILSS). The PCU 320 calculates the elements in the cross-correlation matrices $R_{MF}$ or $R_{rake}$. The outputs from the PCU 320 are used by the ILSS 330 to estimate either Hd or d depending on the architecture used. In the case of the decorrelator-Rake (FIG. 3) the estimates of Hd are Rake-combined to form $\hat{d}$ as described in equation (3). Since the cross-correlation matrix is banded, the Gauss-Seidel algorithm can be modified to be a block-wise iteration on sub-blocks of the matrix. The width of the band is 3KL for $R_{MF}$ and 3K for $R_{rake}$.

The computation and hardware complexity of the SIC depends highly on the system parameters. In accordance with the embodiment, a target realization of the SIC that takes into account realistic parameters of the commercially operational W-CDMA systems of 100 simultaneous voice user per sector i.e. K=100, at least 10 resolvable multipath components i.e. L=10, and the effective support of the chip waveform determined by Q=3. Under these considerations the throughputs of the PCUs for the decorrelator-Rake and Rake-decorrelator (FIG. 4) receivers are 90 G elements per second and 9 M elements per second, respectively, with computational complexity scaling as $O(N(KL)^2)$ and $O(N(KL)^2)+O((KL)^2)$, and falling in the Teraflop range. The throughputs of the ILSS units are then 30 Msymbol/s and 3 Msymbol/s for the same receivers with computational complexity scaling as $O((KL)^2)$ and $O(K^2)$ respectively.

RSFQ Implementation Issues

Due to the Teraflop range of operations, the SIC would require application specific integrated circuits (ASICs) for implementation of both parts, computing the elements of the cross-correlation matrix and performing iterations.

The computation of each element of the cross-correlation matrices $R_{MF}$ and $R_{rake}$ consists of four parts:
generating all K L PN codes corresponding to all channel delays plus (2Q+1)KL replicas shifted on $\pm QT_c$;
correlating all codes with each other;
weighting the correlations with the chip waveform values v[q] to form $R_{MF}$;
and further combining them using channel coefficients $h_{k,l}$ to form $R_{rake}$.

The following is a discussion of the architectures of the PCU building block, parallel-serial RSFQ cross-correlation combiner (CC), the operation of the ILSS building block, and the parallel-serial RSFQ multiply-accumulate unit (MAC).

Cross-correlation Combiner

Figure 5:
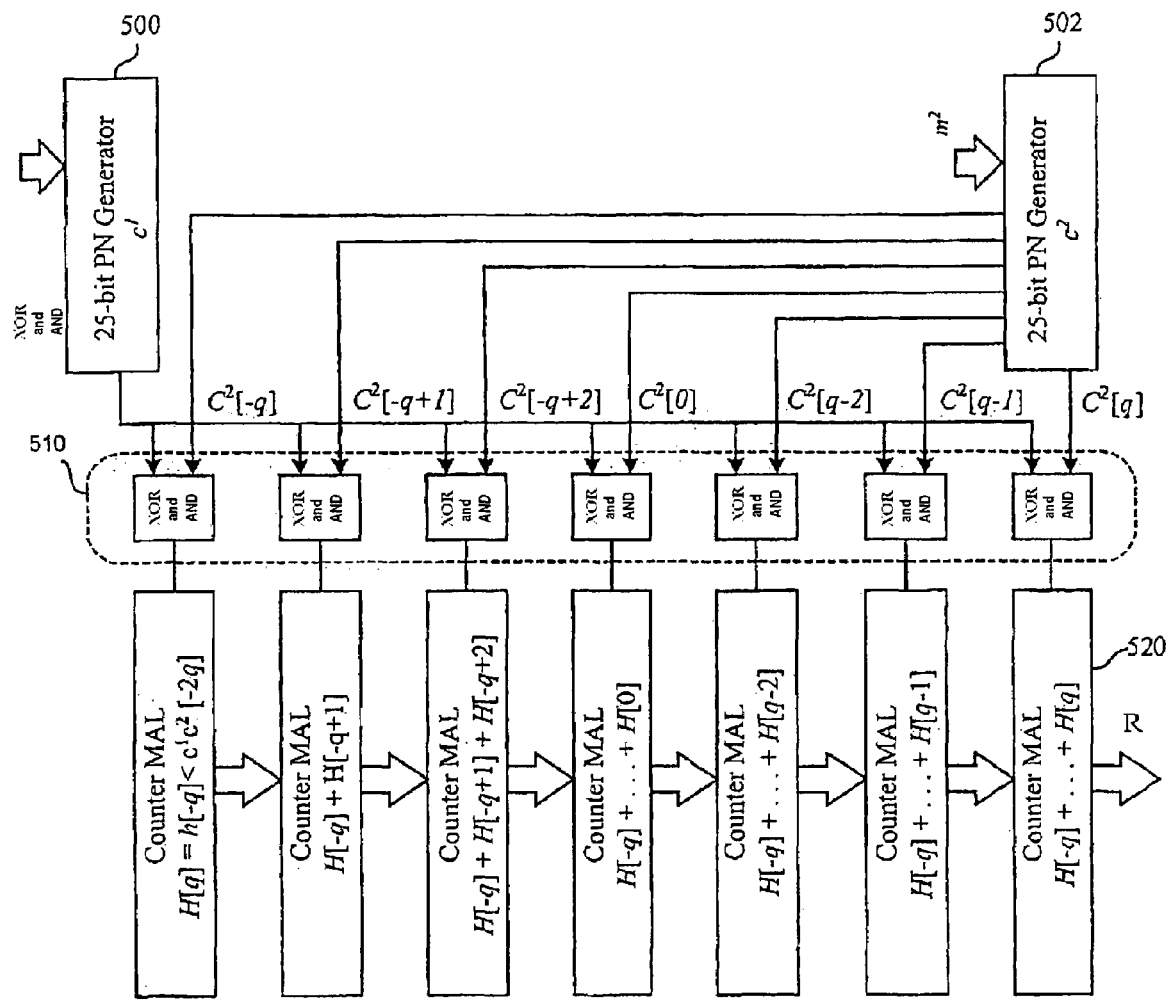
FIG. 5 shows a block diagram of a two-channel RSFQ cross-correlation combiner operating in accordance with the invention.

FIG. 5 shows a block diagram of a two-channel RSFQ cross-correlation combiner operating in accordance with the invention. The CC calculates each element of $R_{MF}$ through three steps: generating the codes; computing cross-correlations; and computing their linear combinations using chip waveform values. The CC block has a regular structure and, for simplicity, two channels will be considered. Two 25-bit PN generators (500, 502) produce a maximum of 128 bit user specific codes $c_{k,l}^1$, $c_{k',l'}^2$, using, as input from the channel estimation unit (CEU), two 25 bit delay masks $m_{k,l}^1$ and $m_{k',l'}^2+Q$, representing symbol and chip offsets. The values of $c_{k',l'}^2[q]$ are taken from the bits of the second PN generator shifted from the last bit on 2Q.

The correlation measure of $(c^1, c^2[q])$ is calculated as the number of equal elements minus the number of unequal elements in the two sequences. Therefore, each pair of output bits from the PN generators is compared on XOR and AND gates 510, then the results are forwarded to the ripple counter 520. The counter requires 8 bits to be able to process the maximum 128 is and to represent the result in two-th complementary form.

To achieve partial cross-correlations, an internal clock generator is used that produces the number of clocks determined by the relative delays between codes. All partial cross-correlations are multiplied on constant supplied from CEU chip waveform gains v[q] (5 bit integer numbers) with the use of 2Q serial multipliers and accumulated with the help of 13 bit adders, one for each counter.

The code generation, computing cross-correlations, multiplication and accumulation operations are pipelined. The critical stage of the pipeline is the generation and comparison of the maximum 128 bit codes that should be partially parallelized to achieve the required speed of 4.5 GHz. The serial PN generator based on the linear feedback shift register (LFSR) can be replaced by the sixteen identical generators. Each of these produces 8 bits of the 128 bit sequence. After 8 bits, the contents of the shift register are loaded into the next generator, and the previous one can be used for generation of the new code. The RSFQ LFSR PN generator has a four-clock initialization cycle that makes the latency of the whole construction with sixteen generators equal to twelve clocks. The interested reader may refer to the publication [11] by present inventor Kidiyarova-Shevchenko A. Yu 2002 RSFQ spreading code generator for multiuser detection Physica C, v. 368, pp. 222-226. The operation of the counters is parallelized in the same way, by replacing one 7 bit counter on 16 with the number of bits increasing from 3 to 7. When the first 8 bits have been processed in the first counter, the contents are moved to the next.

In total, all the PN generators in the PCU consume about $22 \times 10^3$ Josephson junctions, with 340 Josephson junctions per generator (see above publication). The implementation of comparators and counters would require $17 \times 10^3$ Josephson junctions. Each integer 5×7 multiplier and adder consists of about 400 Josephson junctions, which leads to $24 \times 10^3$ Josephson junctions in the PCU. Further discussion of which is given in the publication [12] by Kidiyarova-Shevchenko A Yu 2002 RSFQ iterative linear system solver for superconducting multiuser detection Physica C, v. 372-376, pp. 131-134. Targeting the integration density of 10,000 Josephson junctions per chip, the implementation of the PCU would be possible with a multichip-module (MCM) of about 63 chips. Such an amount of 5×5 mm² chips can be collected from one 6 inch wafer with a yield of 20%.

ILSS Building Blocks

Figure 6:
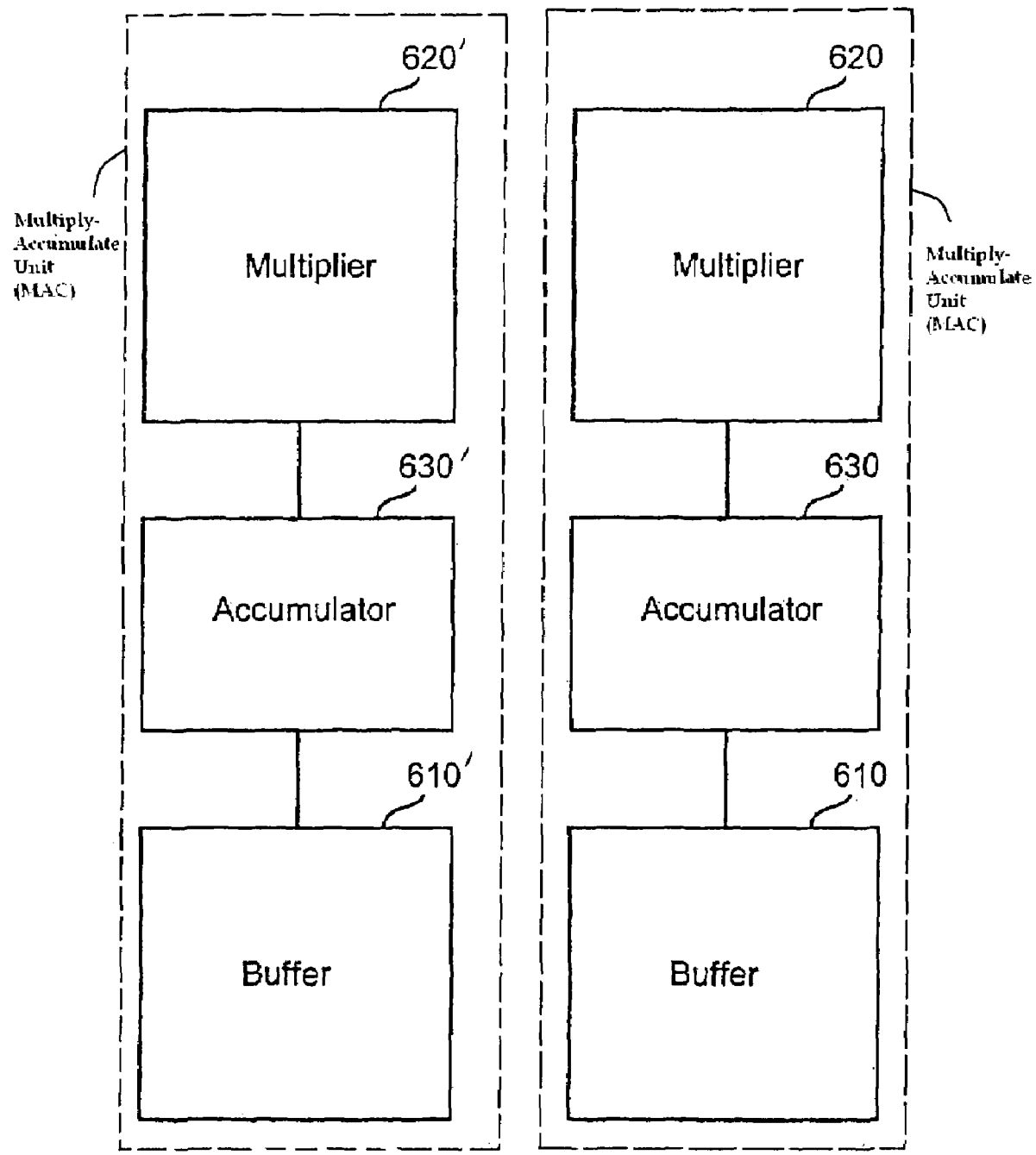
FIG. 6 shows a simplified block diagram of an exemplary RFSQ MAC operating in accordance with the invention.

FIG. 6 shows a simplified block diagram of an exemplary RFSQ MAC (multiply accumulate unit) operating in accordance with the invention. As mentioned earlier, the complexity of the ILSS is determined by complex MACs performing the multiply/accumulate operation over the cross-correlation matrix row and element of the complex vector of the data bit estimates. Since the real and complex components of the signal can be processed independently, one complex MAC is a combination of two identical integer MACs. Each MAC consists of a shift register 610, 610' to store the elements of vector $y_{MF}$, a serial multiplier 620, 620' to perform the multiplication of vector y on matrix $R_{MF}$ row, and a parallel adder 630, 630' that accumulates the results of the multiplication and contents of the shift register. In accordance with the Gauss-Seidel algorithm, each MAC uses elements of the vector $Y_{MF}$ recently updated from the previous stages. Each MAC operates simultaneously and the units communicate through a single bit bus.

The latency of the stage is the sum of the synchronization time of three clocks and the delay of the serial multiplier, which in the conventional case is N+2, where N≦16 is the processing word length. A further discussion is given in the publication by Kidiyarova A. Yu. et al RSFQ Asynchronous Serial Multiplier and Spreading Codes Generator for Multiuser Detector, IEEE Trans. Appl. Supercond. 2003 in press. The RSFQ serial multiplier can be improved with the help of the 'shifting over zeros' technique that allows us to compute N×N bit products over −0.7(N+2) clock cycles and to use 30×N=390 Josephson junctions. The execution time of such a multiplier becomes data-dependent and requires the asynchronous operation of the ILSS. However, the asynchronous operation is also natural for the implementation of the PCU where the amount of computations is dependent on overlapping between symbols.

Each stage of the ILSS unit processes both the complex and real components of the data and comprises approximately 3000 Josephson junctions. In total, the realization of the ILSS would require a MCM with about 20 chips operated at 54 GHz and with an integration density of 10,000 Josephson junctions per chip. It should be noted that the specifications provided are only approximate in which the specifications will vary with the evolutionary state of the technology.

Architecture

Figure 7:
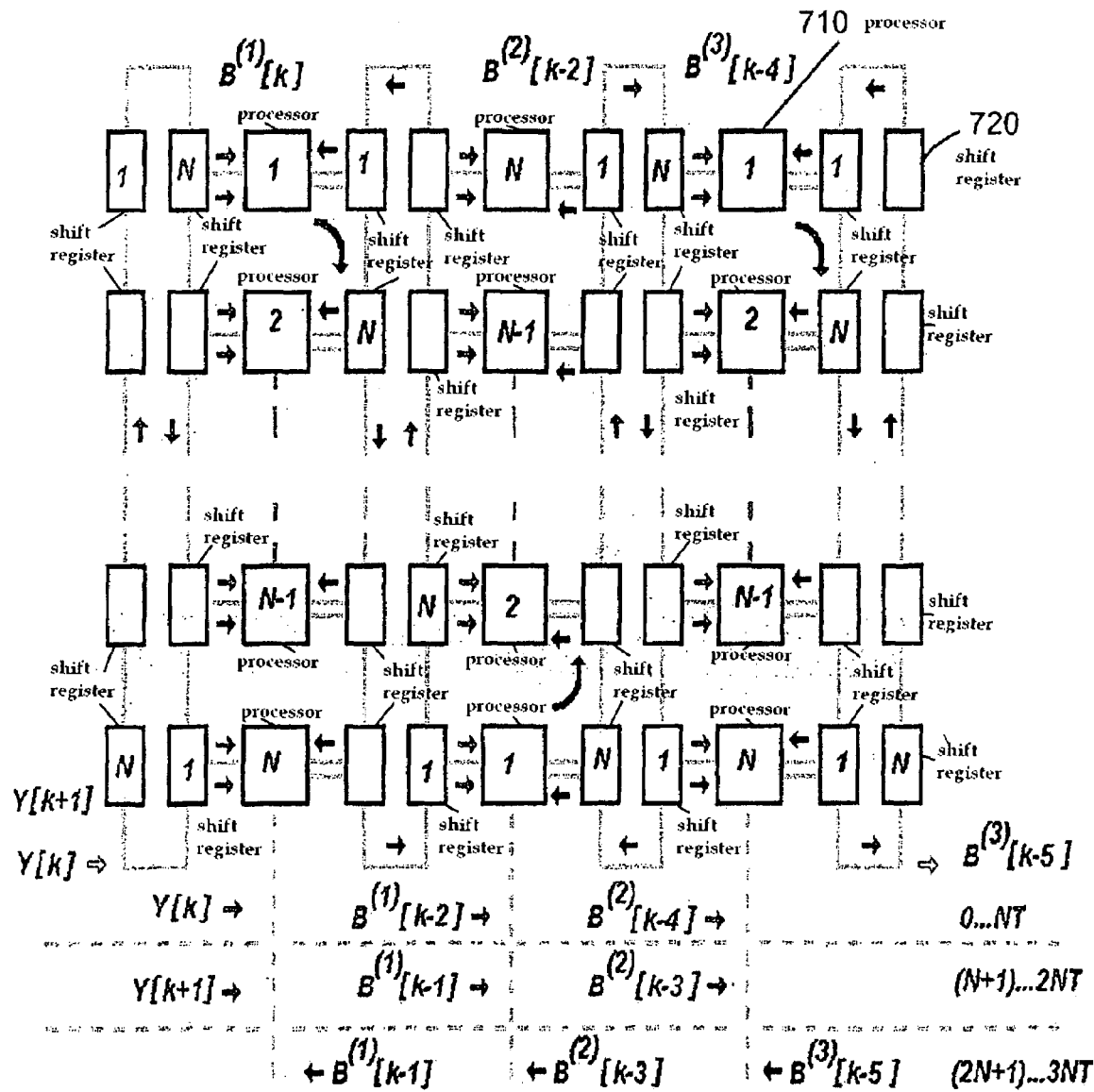
FIG. 7 is a general block diagram of the RSFQ SIC multi-processor architecture operating in accordance with the invention.

FIG. 7 is a general block diagram of the RSFQ SIC multiprocessor architecture operating in accordance with the invention. The RSFQ SIC is a vector machine performing iterative solution of system of linear equations built on chains of processors consisting of an RSFQ Multiply-accumulate unit (MAC) and an RSFQ Partial crosscorrelation unit (PCU). All processors 710 in a chain operate in parallel such that each block is computing one dedicated element of vector of transmitted symbols at time T. In one processor, a PCU unit is used for generation of the interference coefficients corresponding to this element and a MAC unit is used for interference cancellation at this element. Between the processors are dynamic memories, implemented as RSFQ shift registers 720. The dynamic memory is used for loading the initial data from the despreader or Rake combiner to store the intermediate estimates of the received symbols, in addition to communicating data between iterative stages.

Each MAC calls for its interference coefficients from the attached PCU stage. The PCU stage computes cross-correlation coefficients between codes using delay masks obtained from the CEU, combines these coefficients against the waveform amplitudes and combines the result against the channel amplitudes. MAC stages produce symbol estimates, one by one. Each obtained symbol estimate is fed to the next processors until the end of iteration. The initial vector for the first chain at the beginning of each computational cycle is the output of the despreader of the Rake combiner.

Performance

Due to the successive nature of the algorithm the RSFQ SIC introduces delay equal to the 3NTproc, where N is the dimension of the system and Tproc, is a time required for execution of one PCU and MAC operation. Therefore, the throughput of the SIC is $f_{data}=f_{proc}/3N$. In the decorrelator-Rake circuit both devices have similar delays coming from the serial spreading code generator and the serial multiplier.

In the Rake-decorrelator circuit PCU introduces the major delay since additional serial multipliers are used for combining the multi-paths against their amplitudes. As a result both approaches are comparable in terms of throughput and hardware complexity.

Each processor operates with fixed-point arithmetic with maximum 16 bits precision. RSFQ implementation of PCU and MAC is based on parallel-serial architecture. Overall complexity will be dependent on currently available and future fabrication technology.

The present invention contemplates a general approach to the application of fast RSFQ technology into multi-user detection in 3G, W-CDMA, cellular systems. The utilization of fast speed of RSFQ circuits in order to make multi-user detection simple and at the same time reliable, which is not practical with convention silicon-based technologies. The speed advantage of RSFQ allows computations in real time of all the elements of the cross-correlation matrix between codes to realize the SIC, which gives better performance and requires less hardware than parallel algorithms. In the realization of RSFQ, a full-blown wideband CDMA system was considered with 100 voice equivalent channels where the parameters of which, have not fully been considered for multi-user detection. Given the present state of RSFQ technology, implementation of the SIC is estimated to require a MCM with about 80 chips at an integration density of 10,000 Josephson junctions per chip and an operating frequency of approximately 54 GHz. As the technology advances, the operational speeds will increase accompanied with drastically reducing the number of chips thereby further lowering the cost of implementing the SIC. The resulting reduction in interference provided by the invention is especially suitable for transmitting data since the wireless transmission of data is much more sensitive to bit errors when compared to voice transmissions.

Possible Modifications to Embodiments

A first possible modification can be that inside of main iterations dealing with signals arrived at different time intervals, the so-called outer iterations, the inner iterations can be done under some conditions in parallel way. This is possible because the overall performance of the RSFQ SIC is not strictly dependent on how the inner iterations are performed and thus a parallel algorithm such as a Jacobi algorithm can be used. The change in the algorithm would require a change in the combinations of processors and a more sophisticated mechanism in managing bus cash.

A second possible modification is of a more general nature in that the signal processing required for multi-user detection can potentially be moved before the matched filters. In this case, the bit stream from the front-end ADC is fed directly into the RSFQ SIC. The RSFQ SIC has KL blocks where each block comprises a matched filter for dispreading the signal, and a decision block and modulator to encode the detected signals back. After the encoding, the detected signals are subtracted from the total received signal. There are algorithms that deal with such a structure. From the practical point of view, a large amount of memory is needed because the incoming signal from the front-end signal should be delayed by the time of execution of one operation by RSFQ SIC stage. The memory size would increase in proportion to the total number of transmitted signals per packet multiplied by the oversampling factor. Various types of memory can be used such as static or dynamic memories (SRAM or DRAM), or flash memory (non-volatile memory). In the case of static memory, a single block is placed before all stages of RSFQ SIC. The introduction of static memory increases the hardware complexity and reduces the speed due to the addressing, however advances in technology may mitigate this aspect somewhat. In the case of dynamic memory, the RSFQ shift registers of appropriate length are placed between each of the stages.

Furthermore, the RSFQ SIC architecture can be based on the full-parallel arithmetic, e.g. full-parallel multipliers, adders, registers, and code generators. Full parallel architectures are difficult to implement outside laboratory conditions due to the limited integration density in the fabrication processes for reliable RSFQ devices. However, as technology advances and densities increase this will be much more feasible parallel architectures are possible. In general, to realize full-parallel architecture an integration density of about 100000 Josephson junctions per chip is required.

Although the invention has been described in some respects with reference to specified embodiments thereof, variations and modifications will become apparent to those skilled in the art. In particular, the invention is applicable to all direct sequence CDMA systems such as CDMA2000, for example, where the code correlator block is readily adaptable to different standards and leaving the other blocks substantially unchanged. Furthermore, the invention can be used, for example, for interference rejection in a ship-to-land (and vice versa) communications link and in military communication systems. It is therefore the intention that the following claims not be given a restrictive interpretation but should be viewed to encompass variations and modifications that are derived from the inventive subject matter disclosed.

Appendix

Vector Model

Regarding the iterative methods for solving systems of linear equations in the invention includes the need to form the $R_{MF}$ or $R_{rake}$ matrices, in which we show that this depends on the chip waveform and the codes of the user, channel gains and delays.

For clarity, a simplified model of a full-blown W-CDMA system is discussed. However, the described architecture of the multi-user detector can be easily adapted for a more complicated scenario. Specifically, a K-user system is considered where the baseband signal for each kth user is, $$s_k(t) = \sum_{n=0}^{P-1} d_k[n] c'_{n,k}(t)$$

where P is the number of transmitted bits per user (packet length) and, $$c'_{n,k}(t) = \sum_{j=0}^{N-1} c'_{n,k}[j]\psi(t - nT - jTc).$$

The signal $\psi(t)$ is the chip waveform, $f_{data}=1/T$ is the data rate (bits per second), and $f_{chip}=1/T_c=N/T_c$ is the chip rate.

We assume that all the user signals are transmitted over L-path slowly fading channels. Hence, the noise-free received baseband signal can be written as, $$z(t) = \sum_{k=1}^{K} \sum_{l=1}^{L} h_{k,l} s_k(t - \tau_{k,l})$$

where $h_{k,l}$ and $\tau_{k,l}$ are the complex channel gain and delay of the kth user's lth path, respectively.

The received signal is fed through a linear filter with an impulse response $\psi(-t)$ (i.e. chip-matched filtering), and the output of the filter is sampled every $T_c/N_s$ seconds (i.e. oversampling with a factor $N_s$) yielding the discrete time signal, $$r(iT_c/N_s) = z(t) * \psi(-t)|_{t=iTc/Ns} = \sum_{k=1}^{K} \sum_{l=1}^{L} h_{k,l} \sum_{n=0}^{P-1} d_k[n] c_{n,k,l}[i]$$

where * is the convolution operator. The effective spreading code is, $$c_{n,k,l}[i] = \sum_{j=0}^{N-1} c'_{n,k}[j] v([i - jN_s - nNN_s - p_{k,l}]T_c/N_s)$$

where $v(t)=\psi(t)*\psi(-t)$ and $\tau_{k,l}=p_{k,l}T_c/N_s$. We assume that $v(t)$ is a pulse with a raised-cosine spectrum with roll-off a=0.22 (used in W-CDMA) with the effective support $t \in [0, 2QT_c]$.

We form the vector r, $$r=[r(0)\ r(T_c/N_s) \ldots r((M-1)T_c/N_s)]^T$$

where M is chosen to be large enough to capture the contribution from all bits of all users. It is easy to show that, r=CHd where the columns of the M×KLP matrix C are samples of $c_{n,k,l}[i]$. To be precise, the (i, 1+(k−1)K+nLK)th element of C is equal to $c_{n,k,l}[i-1]$. The KLP×KP matrix H is block-diagonal and defined as, $H=\text{diag}(H_0, H_1, \ldots, H_{P-1})$ $H_n=\text{diag}(h_1, h_2, \ldots, h_K)$ $h_k=[h_{k,1}\ h_{k,2} \ldots h_{k,L}]^T$.

Finally, $d=[d_1[0] \ldots d_K[0] \ldots d_1[1] \ldots d_K[1] \ldots d_1[P-1] \ldots d_K[P-1]]^T$ The output from the bank of the KL matched filters (one filter per user and path) can be found to be, $y_{MF}=C_{MF}^T r$ where $C_{MF}$ is of the same dimensions as C. The (i, 1+(k−1)K+nLK)th element of $C_{MF}$ is equal to $C_{MF,n,k,l}[i-1]$, which is defined as, $$C_{MF,n,k,l}[iN_s + nNN_s + p_{k,l} + QN_s] = \begin{cases} c'_{n,k}[i], & \text{for } i = 0, 1, \ldots, N-1 \\ 0, & \text{otherwise} \end{cases}$$

Hence, we have shown that, $$R_{MF} = C_{MF}^T C$$

It can also be shown that, due to the finite support of v(t), the matrix $C_{MF}$ is a band matrix with bandwidth 2KL. The (q, r)th element of $R_{MF}$ can be computed to be, $$[R_{MF}]_{q,r} = \sum_{i=0}^{N-1} c_{MF,n,k,l}[iN_s + nNN_s + QN_s + p_{k,l}] \times$$
$$c_{n',k',l'}[iN_s + nNN_s + QN_s + p_{k,l}]$$

$$= \sum_{i=0}^{N-1} c'_{n,k}[i] \sum_{j=0}^{N-1} c'_{n',k'}[j] v([(i-j)N_s + (n-n')NN_s +$$
$$(p_{k,l} - p_{k',l'}) + QN_s]T_c/N_s)$$

$$= \sum_{m=-(N-1)}^{N-1} v([mN_s + (n-n')NN_s + (p_{k,l} - p_{k',l'}) +$$
$$QN_s]T_c/N_s) \sum_{i=0}^{N-1} c'_{n,k}[i] c'_{n',k'}[i-m]$$

where k, l, n and k', l', n' depend on q and r. Furthermore, an element of $R_{rake}$ is computed to be, $$[R_{rake}]_{q,r} = h^*_k A h_{k'}$$

where A is a certain L×L submatrix of $R_{MF}$. Again, the definitions of A, k and k' depend on q and r. We can rewrite the expression for $[R_{rake}]_{q,r}$ $$[R_{rake}]_{q,r} = \sum_{l=1}^{L} \sum_{l'=1}^{L} h^*_{k,l} h^*_{k',l'} [A]_{l,l'}$$

The invention claimed is:

1. A method of reducing multi-user interference (MAI) in a wireless direct sequence CDMA wireless system comprising at least one base station transmitting to and receiving signals from a plurality of mobile station users, wherein the method includes reducing interference with a multi-user detector located within said at least one base station comprising the steps of:
   receiving at the at least one base station a digital input signal comprised of a plurality of binary code sequences from the mobile station users;
   processing the digital input signal with a bank of matched filters and producing matched filter output vectors from the bank of matched filters;
   feeding the matched filter output vectors into a superconducting digital rapid single flux quantum (RSFQ) vector processing unit applying a successive interference cancellation (SIC) iterative technique (RSFQ SIC) to solve a cross-correlation matrix to decorrelate the plurality of binary code sequences;
   reducing the interference by removing interference components between the binary code sequences; and
   feeding an output from the RSFQ SIC into a bank of Rake combiners to recover original data transmitted by the mobile station users.

2. A method according to claim 1 wherein the implemented multi-user detector of the direct sequence CDMA wireless system operates in accordance with the Wideband Code Division Multiple Access (W-CDMA) standard.

3. A method according to claim 1 wherein in the receiving step, the binary code sequences from the mobile station users are W-CDMA Gold long spreading codes having a sequence length of $2^{41}$, or VL-Kasami short spreading codes with a sequence length of 256.

4. A method according to claim 1 wherein the RSFQ SIC operates at a frequency of at least 54 GHz and is capable of removing interference in a W-CDMA system operating with at least 100 simultaneous voice user per sector with at least 10 resolvable multipath components per user, and an effective support Q of a chip waveform determined by Q=3.

5. A method according to claim 1 wherein in the applying step, the SIC iterative technique employs a Gauss-Seidel iteration algorithm to solve the cross-correlation matrix $R_{MF}$ of the binary code sequences given by, $$[R_{MF}]_{q,r} = \sum_{m=-(N-1)}^{N-1} v([mN_s + (n-n')NN_s +$$
$$(p_{k,l} - P_{k',l'}) + QN_s]T_c/N_s) \sum_{i=0}^{N-1} c'_{n,k}[i] c'_{n',k'}[i-m]$$

where k, l, n and k', l', n' depend on q and r, $c_{n,k}'[i]$ is the binary code sequence for the nth user's kth symbol, v(t) is a causal pulse with a raised-cosine spectrum, $T_c = 1/f_{chip}$, and $\tau_{k,l} = p_{k,l}T_c/N_s$ is a delay of the kth user's lth propagation path, wherein q and r are the qth and rth element of $R_{MF}$; $T_c$ is a sampling time with $N_s$ being an oversampling factor.

6. A method according to claim 1 wherein a partial cross-correlation unit (PCU) is used to calculate the elements in the cross-correlation matrix $R_{MF}$.

7. A method according to claim 6 wherein the output from the PCU is used by an iterative linear system solver (ILSS) to estimate a block diagonal matrix Hd whereby a Gauss-Seidel algorithm is modified to be a block-wise iteration on sub-blocks of the block diagonal matrix.

8. A method according to claim 1 wherein the RSFQ vector processing unit receives inputs that includes a vector of channels gains and a vector of relative channels delays from a channel estimation unit (CEU).

9. A method of reducing multi-user interference (MAI) in a wireless direct sequence CDMA wireless system comprising at least one base station transmitting to and receiving signals from a plurality of mobile station users, wherein the method includes reducing interference with a multi-user detector located within said at least one base station comprising the steps of:
   receiving at the at least one base station a digital input signal comprised of a plurality of binary code sequences from the mobile station users;
   processing the digital input signal with a bank of matched filters to produce matched filter output vectors;
   receiving the matched filter output vectors into a bank of Rake combiners to produce Rake combiner output vectors;
   receiving the Rake combiner output vectors into a superconducting digital rapid single flux quantum (RSFQ) vector processing unit applying a successive interference cancellation (SIC) iterative technique (RSFQ SIC) to solve a cross-correlation matrix to decorrelate the plurality of binary code sequences; and
   reducing the interference by removing interference components between the plurality of binary code sequences.

10. A method according to claim 9 wherein the direct sequence CDMA wireless system operates in accordance with the Wideband Code Division Multiple Access (W-CDMA) standard.

11. A method according to claim 9 wherein, in the receiving step of the digital input signal, the binary code sequences from the mobile station users are W-CDMA Gold long spreading codes having a sequence length of $2^{41}$, or VL-Kasami short spreading codes with a sequence length of 256.

12. A method according to claim 9 wherein the RSFQ SIC operates at a frequency of at least 54 GHz and is capable of removing interference in a W-CDMA system operating with at least 100 simultaneous voice user per sector with at least 10 resolvable multipath components per user, and an effective support of a chip waveform.

13. A method according to claim 9 wherein in the applying step, the SIC iterative technique employs a Gauss-Seidel iteration algorithm to solve the cross-correlation matrix $R_{rake}$ of the binary code sequences given by, $$[R_{rake}]_{q,r} = \sum_{l=1}^{L} \sum_{l'=1}^{L} h_{k,l}^* h_{k',l'}^* [A]_{l,l'}$$

where A is a certain L×L submatrix of $R_{MF}$, and $h_{k,l}$ is a complex channel gain of a kth user's lth propagation path, wherein q and r are the qth and rth element of $R_{MF}$; $T_c$ is a sampling time with $N_s$ being an oversampling factor.

14. A method according to claim 9 wherein a partial cross-correlation unit (PCU) is used to calculate the elements in the cross-correlation matrix $R_{rake}$.

15. A method according to claim 14 wherein the output from the PCU is used by an iterative linear system solver (ILSS) to estimate a block diagonal matrix d whereby a Gauss-Seidel algorithm is modified to be a block-wise iteration on sub-blocks of the block diagonal matrix.

16. A method according to claim 9 wherein the RSFQ vector processing unit receives inputs that includes a vector of channels gains and a vector of relative channels delays from a channel estimation unit (CEU).

17. A method according to claim 9 wherein in the RSFQ SIC, inner iterations, performed inside of main iterations dealing with signals arrived at different time intervals, are performed in a parallel way.

18. A method according to claim 9 wherein signal processing required for said multi-user detector is performed on a chip level.

19. A multi-user detector apparatus for use with interference cancellation in a radio base station receiver operating within a direct sequence CDMA wireless system, wherein said base station receiver includes a channel estimation unit (CEU) for estimating characteristics of a channel, a pseudo-number generator for use with despreading user code sequences, a bank of matched filters for rejecting interference in an input signal, a bank of Rake combiners for processing signal multipaths, said multi-user detector apparatus comprising:
a partial cross-correlation unit (PCU) linked to the CEU for calculating the elements of a cross-correlation matrix related to the user code sequences; and
a superconducting digital rapid single flux quantum (RSFQ) vector processing unit linked to the PCU and to the bank of matched filters, wherein the output vectors from the bank of matched filters are fed into the RSFQ vector processing unit for iterative processing, and wherein the output of the RSFQ processing unit is fed into the bank of Rake combiners for removing interference components from original user code sequences.

20. An apparatus according to claim 19 wherein the RSFQ vector processing unit is a vector machine that comprises superconducting logic circuits capable of performing a successive interference cancellation (SIC) iterative technique for decorrelating the cross-correlation matrix associated with the user code sequences and is designated as an RSFQ SIC.

21. An apparatus according to claim 20 wherein the RSFQ SIC comprises a plurality of Multiply-accumulate units (MAC) such that all processors in one chain are performed in parallel in such a way that each block is computing one dedicated element of vector of transmitted symbols at rime T.

22. An apparatus according to claim 20 wherein an iterative linear system solver (ILSS) for processing a Gauss-Seidel algorithm in said SIC iterative technique.

23. An apparatus according to claim 20 wherein the RSFQ SIC further comprises an iterative linear system solver (ILSS) unit for running a Gauss-Seidel algorithm.

24. A multi-user detector apparatus for use with interference cancellation in a radio base station receiver operating within a direct sequence CDMA wireless system, wherein said radio base station receiver includes a channel estimation unit (CEU) for estimating characteristics of a channel, a pseudo-number generator for use with despreading user code sequences, a bank of matched filters for rejecting interference in an input signal, a bank of Rake combiners for processing signal multipaths, said multi-user detector apparatus comprising:
a partial cross-correlation unit (PCU) linked to the CEU for calculating elements of a cross-correlation matrix related to the user code sequences; and
a superconducting digital rapid single flux quantum (RSFQ) vector processing unit linked to the PCU and to the bank of matched filters, wherein the output vectors from the bank of matched filters are fed into the bank of Rake combiners, and the output vectors of the bank of Rake combiners are fed into the RSFQ vector processing unit for iterative processing for removing interference components from original user code sequences.

25. An apparatus according to claim 24 wherein the RSFQ vector processing unit is a vector machine that comprises superconducting logic circuits capable of performing a successive interference cancellation (SIC) iterative technique for decorrelating the cross-correlation matrix associated with the user code sequences and is designated as an RSFQ SIC.

26. An apparatus according to claim 25 wherein the RSFQ SIC comprises a plurality of Multiply-accumulate units (MAC) such that all processors in one chain are performed in parallel in such a way that each block is computing one dedicated element of vector of transmitted symbols at time T.

27. An apparatus according to claim 25 wherein an iterative linear system solver (ILSS) for processing a Gauss-Seidel algorithm in said SIC iterative technique.

28. An apparatus according to claim 25 wherein the RSFQ SIC further comprises an iterative linear system solver (ILSS) unit for running a Gauss-Seidel algorithm.

29. An apparatus according to claim 24 wherein signal processing required for multi-user detection is located before the bank of matched filters and a memory for storing signal processing data is included such that a size of the memory is in proportion to a total number of transmitted signals per packet multiplied by an oversampling factor.

30. A method of reducing multi-user interference (MAI) in a wireless direct sequence CDMA wireless system comprising at least one base station transmitting to and receiving signals from a plurality of mobile station users, wherein the method includes reducing interference with a multi-user detector located within said at least one base station comprising the steps of:

processing the digital input signal with a bank of matched filters and producing matched filter output vectors from the bank of matched filters;

feeding the matched filter output vectors into one of a superconducting digital rapid single flux quantum (RSFQ) vector processing unit and a bank of Rake combiners applying a successive interference cancellation (SIC) iterative technique (RSFQ SIC) to solve a cross-correlation matrix to decorrelate the binary code sequences;

reducing the interference by removing interference components between the binary code sequences; and feeding an output from the RSFQ vector processing unit into the bank of Rake combiners to recover original data transmitted by the mobile station users, or feeding the output of the bank of Rake combiners into the RSFQ vector processing unit.

* * * * *